United States Patent [19]

Brooks

[11] Patent Number: 5,311,000

[45] Date of Patent: May 10, 1994

[54] BAR CODE SCANNER AND METHOD OF SCANNING

[75] Inventor: Michael T. Brooks, Veneta, Oreg.

[73] Assignee: Spectra-Physics Scanning Systems, Inc., Eugene, Oreg.

[21] Appl. No.: 922,875

[22] Filed: Jul. 31, 1992

[51] Int. Cl.$^5$ ............................................. G06K 7/10
[52] U.S. Cl. ................................. 235/462; 235/463; 235/470
[58] Field of Search ............... 235/463, 494, 470, 462

[56] References Cited

U.S. PATENT DOCUMENTS

| | | | |
|---|---|---|---|
| 3,959,624 | 3/1976 | Kaslow | 235/61.11 |
| 4,109,143 | 8/1978 | Yamaguchi et al. | 235/462 |
| 4,152,583 | 5/1979 | Nakamura | 235/462 |
| 4,746,789 | 5/1988 | Gieles et al. | 235/463 |
| 4,794,239 | 12/1988 | Allais | 235/462 |
| 4,879,456 | 11/1989 | Cherry et al. | 235/462 |
| 4,937,439 | 6/1990 | Wanninger et al. | 235/456 |
| 4,958,064 | 9/1990 | Kirkpatrick | 235/384 |
| 4,963,719 | 10/1990 | Brooks et al. | 235/462 |
| 5,086,215 | 2/1992 | Carsner et al. | 235/462 |
| 5,128,527 | 7/1992 | Kawai et al. | 235/462 |
| 5,198,649 | 3/1993 | Brooks | 235/462 |

OTHER PUBLICATIONS

Craig K. Harmon and Russ Adams, Reading Between the Lines, Jan. 1989, pp. 276-277.

Primary Examiner—Donald Hajec
Assistant Examiner—Adrian Young
Attorney, Agent, or Firm—Killworth, Gottman, Hagan & Schaeff

[57] ABSTRACT

A method and an apparatus facilitate scanning an Add-On code portion of a bar code label to determine the bar code data printed thereon by sweeping a scanning beam in a scan path across the Add-On code portion of the label. The bar code label includes bar codes of the type which have a primary code portion and which may also have an Add-On code portion. The method includes the steps of: optically scanning the label and producing an electrical signal indicative of the image of the label which includes a possible Add-On code portion; providing data indicative of the structure of the possible Add-On code portion in response to the electrical signal; subjecting the data indicative of the structure of the possible Add-On code portion to at least one test to determine the existence of an adjacent margin; subjecting the data indicative of the structure of the possible Add-On code portion to at least one test to determine the existence of an Add-On guard pattern; decoding the characters of the possible Add-On code portion of the label; and terminating decoding.

23 Claims, 8 Drawing Sheets

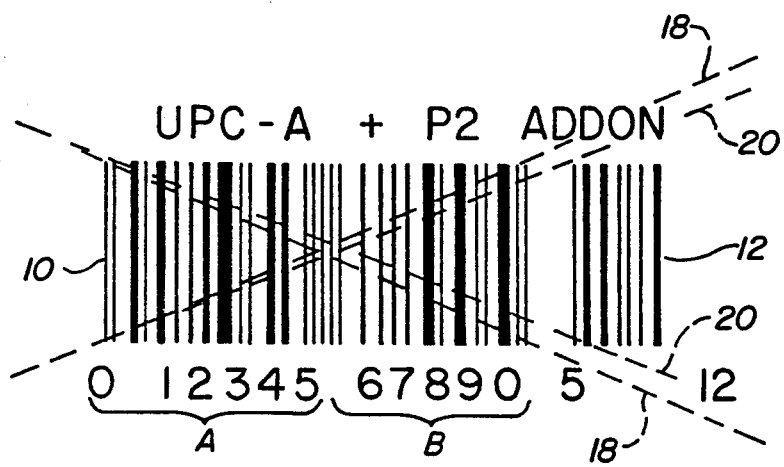
FIG-6A  UPC-A + P2 ADDON
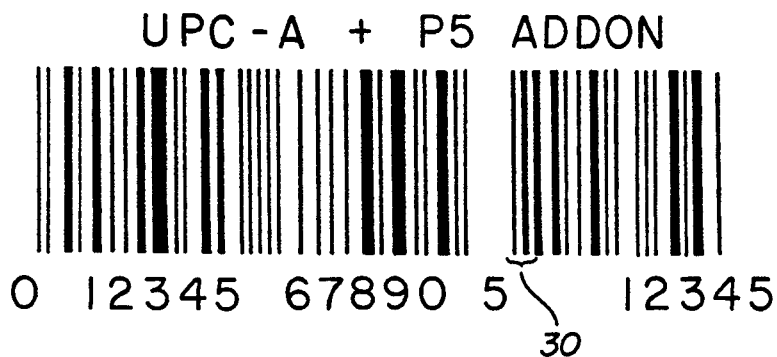
FIG-6B  UPC-A + P5 ADDON
FIG-6C  EAN 13 + P2 ADDON FIG-6D  EAN13 + P5 ADDON
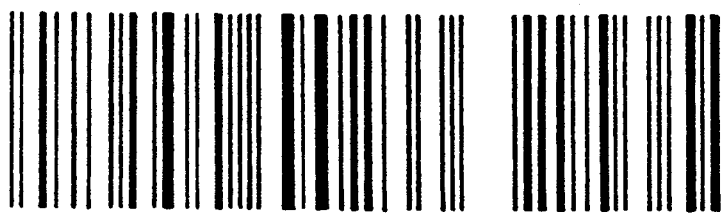
9 086554 690233    12345
FIG-6E  EAN8 + P2 ADDON
2817 9542    12
FIG-6F  EAN8 + P5 ADDON
6563 4271    12345

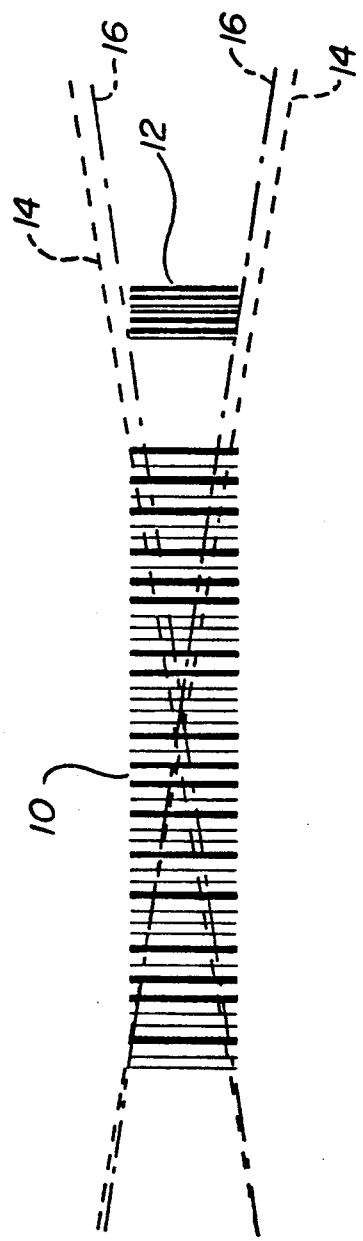

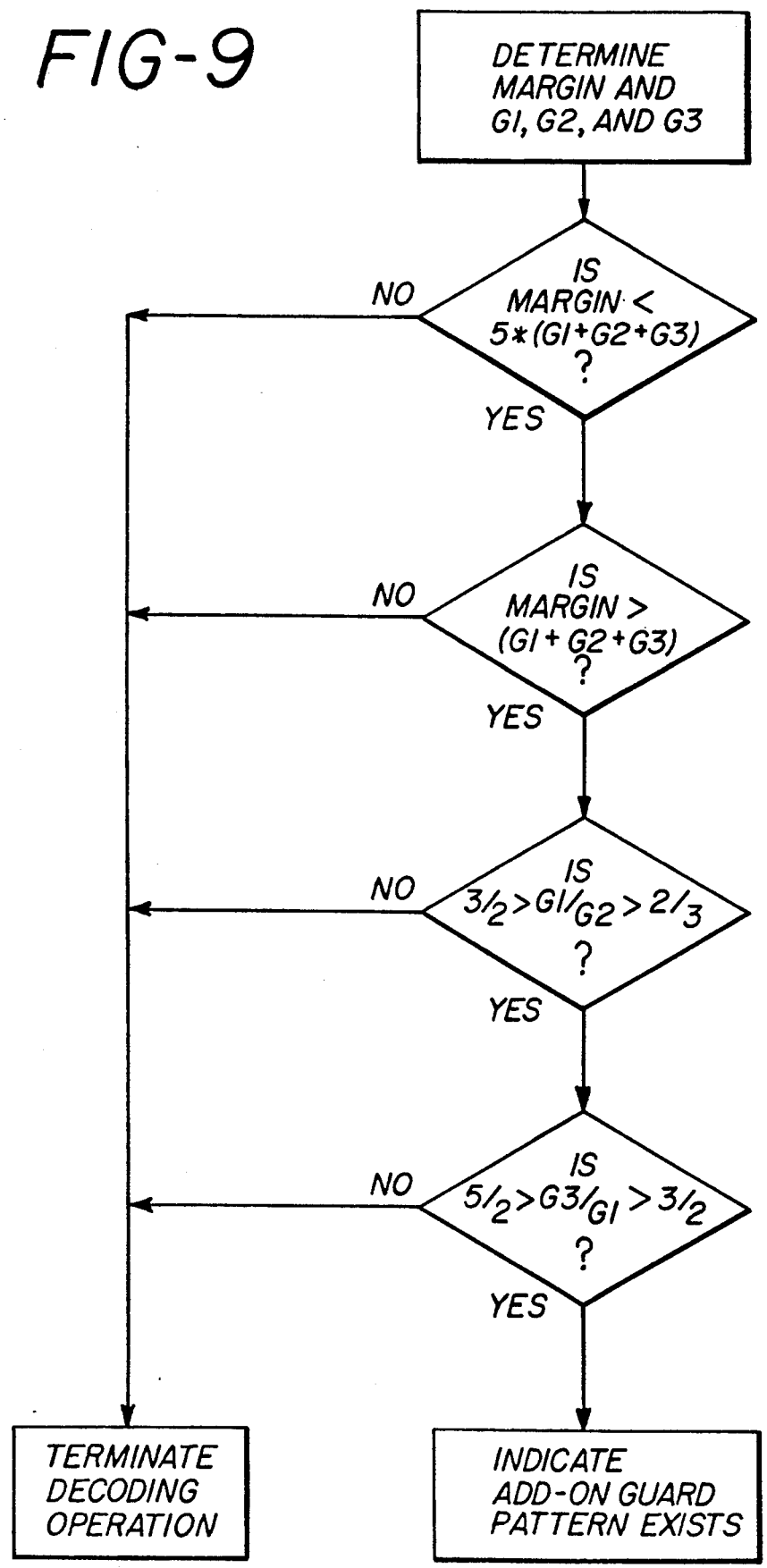

BAR CODE SCANNER AND METHOD OF SCANNING

BACKGROUND OF THE INVENTION

The present invention relates to a computer controlled, bar code scanner apparatus and a method of scanning and, more particularly, to such scanning apparatus and to such a method in which bar code labels of the type including supplemental encodations, termed "Add-On" code portions or segments, are rapidly and reliably scanned without the need for operator adjustment of the scanner apparatus.

Bar code labels are used on a broad range of retail packages and products for check-out and inventory purposes. A scanner, located for example at the check-out station in a retail establishment, is used by a clerk to enter product identification data into an associated computer system.

Typically, a scanner of this type includes a laser source, such as a gas discharge laser or a laser diode, which produces a low power laser beam. The beam passes through appropriate optical lenses and is swept across the package surface by a motor-driven, rotating mirror assembly. In some scanners, the package bearing a bar code label is presented manually to the stationary scanner by a clerk. In other scanners, the scanner is designed to be held by the clerk, and aimed generally at the package. In either event, a portion of the light reflected from the package surface returns through the optical lenses to a detector which provides an electrical signal in dependence upon the level of the reflected light. A signal processing system then analyses the electrical signal produced as the beam sweeps over the bar code label, decoding the encoded scan data.

The scan data may then be transmitted to a host computer or terminal, which determines the total price of the products being purchased, as well as storing the identity of the purchased products for inventory and accounting purposes. The host computer or terminal may be dedicated to a single scanner. Alternatively, a single host computer or terminal may service a number of scanners at the retail establishment.

A number of different bar codes have come into use. The more common ones are generally horizontal in design with alternating vertical dark bars and light spaces therebetween. Groupings of dark bars and light spaces make up the bar code characters. The height of the bars has no purpose other than to permit a scanning beam to successfully pass over the entire length of at least one of the bar code portions or segments to permit reading the portion or segment in one scanning pass. A segment is a set of characters that forms a portion of a valid label. A UPC-A label contains two segments, a left UPC-A segment containing six characters and a right UPC-A segment containing six characters. An EAN 13 label contains two segments, a left EAN 13 segment, containing seven characters and a right EAN 13 segment containing six characters. An EAN 8 label contains two segments, a left EAN 8 segment containing four characters and a right EAN 8 segment containing four characters. A UPC-E label contains one segment having six characters. Common codes include Code Three of Nine, Two of Five, Codabar, Two of Five Non-Interleaved, Two of Five Interleaved, UPC-A, UPC-E, EAN 13, and EAN 8.

The boundaries of segments are distinct bar and space patterns referred to as "guard," "margin," and "center-band" patterns. The guard or margin pattern is the start pattern and the center-band pattern is the stop pattern of a left half segment. The center-band pattern is the start pattern and the guard or margin pattern is the stop pattern of a right half segment.

Also in use is a two or five character "Add-On" supplemental code portion for UPC and EAN labels. An Add-On supplemental code portion is simply an additional grouping of bars and spaces, to one side of the primary bar code portion, which includes additional data to be read by the scanner. The Add-On contains only one bounding pattern, an Add-On guard pattern on the side of the Add-On portion adjacent to the main label. The side of the Add-On portion facing away from the main label portion is unbounded. Add-On code portions are supplemental encodations which were designed principally for use on periodicals and paperback books. Generally, nothing in the main portion of the label indicates whether a Add-On portion is included in the label.

Used in conjunction with the UPC symbol, they satisfy a number of requirements. For UPC-A, EAN 8, EAN 13 and UPC-E symbols, the first bar of the supplemental encodation symbol is separated by a margin, which is nominally nine modules, from the last bar of the UPC symbol. The supplemental encodations are unlikely to be confused with UPC symbols for any existing scanner designs. The decode algorithm for the supplemental Add-On encodations is similar to that for the UPC code. The two character supplemental code was designed for periodical issue number.

Although compatible with the UPC symbol, an Add-On code portion is not mistaken for UPC symbols by scanners designed to read only standard UPC symbols because the Add-On code portion includes a unique guard pattern, and each character of the Add-On code portion is separated from the next character by a delineator character which is encoded 01 (each digit represents a module; "0" represents a light or white space of one module width and "1" represents a dark module or bar of one module width). The left-hand guard pattern for a supplemental Add-On portion is unique, encoded as 1011, differentiating it from the left-hand and right-hand guard bar patterns of the UPC which are encoded 101. A right-hand pattern for the Add-On code portion is not used.

A primary requirement for high volume transaction laser scanners is to operate in a way that the store check-out clerk does not have to worry about the label orientation as the product label is passed over the scanner. The basic function of the scan pattern generating arrangement associated with a scanner is to move the beam of laser light repetitively through a three dimensional pattern. In this way, the scanner is capable of finding and reading labels in as many label orientations as possible.

Since previously it was desired, and in some scanner systems required, that the scanning beam sweep across all of the portions of the label in a single pass, bar code labels including an Add-On code portion present a particularly difficult problem. Such labels have a high aspect ratio, i.e., the ratio of their horizontal dimension to their vertical dimension is particularly large. As a consequence, the range of the orientation of the scan path of the scanning beam of light which has produced a successful read of such labels in prior art systems is more limited than is the case with labels which do not include an Add-On code portion. If a primary code area were read by a conventional scanner and no Add-On code portion were read during the same scanning pass, this might have resulted from the particular orientation of the bar code label with respect to the scan path. Alternatively, this may have resulted from reading a bar code label which did not include an Add-On code portion.

Previously, the approach has been for the clerk operating a scanner to switch the scanner to a special setting when labels having an Add-On code portion were to be read. In this setting, the scanner would acknowledge a valid "read" only when one or two segments of the primary code portion and the Add-On supplemental code portion of a label were both read in the same scanning pass of the beam. When switched to the normal scanner setting, the scanner would read the primary code portion and ignore the Add-On code portion as superfluous.

As will be appreciated, switching the scanner back and forth is time consuming and burdensome. Further, the possibility exists for an erroneous reading of a label in the event that the scanner is switched to the wrong setting.

In other prior systems, it has been required that an Add-On code portion be scanned in the same scanning pass as at least one segment of the primary code portion of the label. As a result, the operation of the scanner was slowed somewhat, and the likelihood of a successful reading of a label reduced.

Accordingly, there is a need for a scanner and a method of scanning in which bar code labels may be read automatically, whether or not they include an Add-On code portion, and in which an Add-On code portion can be quickly recognized and read without simultaneously reading the primary code portion of the label.

SUMMARY OF THE INVENTION

This need is met by a method and an apparatus according to the present invention for scanning an Add-On code portion of a bar code label to determine the bar code data printed thereon. A scanning beam is swept in a scan path across the Add-On code portion of the label. The bar code labels bear bar codes of the type which include a primary code portion and which may also include an Add-On code portion. The method includes the steps of: optically scanning the label and producing an electrical signal indicative of the image of the label which includes a possible Add-On code portion, as by sweeping a scanning beam across the label until the beam sweeps a scanning pass along a scan path which traverses a possible Add-On code portion; providing data indicative of the structure of the possible Add-On code portion in response to the electrical signal; subjecting the data indicative of the structure of the possible Add-On code portion to at least one test to determine the existence of an adjacent margin; subjecting the data indicative of the structure of the possible Add-On code portion to at least one test to determine the existence of an Add-On guard pattern; decoding the characters of the possible Add-On code portion of the label; and terminating decoding. It will be appreciated that the order in which these steps are performed is not critical, and it is within the scope of the present invention to perform these steps in various orders, or to perform two or more of these steps simultaneously.

The step of subjecting the data indicative of the structure of the possible Add-On code portion to at least one test to determine the existence of an Add-On guard pattern may comprise the step of checking to determine whether:

$$Margin < 5*(G1+G2+G3), \text{ and}$$

$$Margin > (G1+G2+G3), \text{ and}$$

$$3/2 > G1/G2 > 2/3, \text{ and}$$

$$5/2 > G3/G1 > 3/2,$$

where G1 is the width of the first bar element of the guard pattern of the possible Add-On code portion, G3 is the width of the second bar element of the guard pattern of the possible Add-On code portion, and G2 is the width of the space between the first and second bar elements of the guard pattern of the possible Add-On code portion. The tests do not have to use the exact limits specified above.

The step of subjecting the data indicative of the structure of the possible Add-On code portion to at least one test to determine the existence of an adjacent margin comprises the step of checking to determine whether a margin exists adjacent to the Add-On guard pattern of the possible Add-On code portion which is greater than a predetermined minimum width and less than a predetermined maximum width.

The predetermined minimum width may be approximately 4 modules in width and the predetermined maximum width may be approximately 20 modules in width, the guard pattern of the possible Add-On code portion consisting of a one module width, first bar element, a two module width, second bar element, and a one module space between the first and second bar elements.

The step of decoding the characters of the Add-On code portion of the label includes the steps of: decoding the first possible character of the possible Add-On code portion, and checking for the existence of an adjacent intercharacter delineator consisting of a bar of width S1 and a space of width S2, decoding each successive possible character after checking for the existence of a preceding intercharacter delineator consisting of a bar of width S1 and a space of width S2, except for the last character in an Add-On code portion since such a character has no following delineator.

The widths of the bar and the space making up each intercharacter delineator are checked to determine that

| | |
|---|---|
| S2 < 2*m | and |
| S1 < 2*m | where m is the nominal single module width calculated from the preceding character, | failing which the possible Add-On code portion is determined not to be an Add-On code portion of a label, and decoding is terminated. For UPC and EAN codes, the nominal single module width is calculated by dividing the preceding character width by seven, since the code rules require a character to be seven modules in width.

The step of decoding each successive possible character after checking for the existence of a preceding intercharacter delineator, consisting of a bar of width S1 and a space of width S2, continues until the first of the following occurs: a) five characters are decoded; b) a character cannot be decoded; or c) an intercharacter delineator does not precede the last character decoded and a trailing margin or white space is found.

Apparatus according to the present invention scans an Add-On code portion of a bar code label to determine the bar code data printed thereon. The bar code label includes a primary code portion and an Add-On code portion. The apparatus includes means for optically scanning the label and producing an electrical signal indicative of the image of the label which includes a possible Add-On code portion. The apparatus further includes means, responsive to the electrical signal, for providing data indicative of the structure of the possible Add-On code portion. The apparatus further includes a means for subjecting the data indicative of the structure of the possible Add-On code portion to at least one test to determine the existence of an adjacent margin, and a means for subjecting the data indicative of the structure of the possible Add-On code portion to at least one test to determine the existence of an Add-On guard pattern. Finally, the apparatus includes means for decoding the characters of the possible Add-On code portion of the label; and means for terminating decoding.

The means for subjecting the data indicative of the structure of the possible Add-On code portion to at least one test to determine the existence of an Add-On guard pattern comprises means for checking to determine whether:

Margin $< 5*(G1+G2+G3)$, and

Margin $> (G1+G2+G3)$, and $3/2 > G1/G2 > 2/3$, and $5/2 > G3/G1 > 3/2$, where G1 is the width of the first bar element of the guard pattern of the possible Add-On code portion, G3 is the width of the second bar element of the guard pattern of the possible Add-On code portion, and G2 is the width of the space between the first and second bar elements of the guard pattern of the possible Add-On code portion. The tests do not have to use the exact limits specified above.

The means for subjecting the data indicative of the structure of the possible Add-On code portion to at least one test to determine the existence of an adjacent margin comprises means for checking to determine whether a margin exists adjacent to the Add-On guard pattern of the possible Add-On code portion which is greater than a predetermined minimum width and less than a predetermined maximum width.

The predetermined minimum width may be approximately 4 modules in width and the predetermined maximum width may be approximately 20 modules in width. The guard pattern of the possible Add-On code portion consists of a one module width, first bar element, a two module width, second bar element, with a one module space between the first and second bar elements.

The means for decoding the characters of the Add-On code portion of the label includes: means for decoding the first possible character of the possible Add-On code portion, means for checking for the existence of an adjacent intercharacter delineator consisting of a bar of width S1 and a space of width S2, and means for decoding each successive possible character after checking for the existence of a preceding intercharacter delineator consisting of a bar of width S1 and a space of width S2.

The widths of the bar and the space making up each intercharacter delineator are checked to determine that

| | |
|---|---|
| $S2 < 2*m$ | and |
| $S1 < 2*m$ | where m is the nominal single module width calculated from the preceding character, | failing which the possible Add-On code portion is determined not to be an Add-On code portion of a label, and decoding is terminated. For UPC and EAN codes, the nominal single module width is calculated by dividing the preceding character width by seven, since the code rules require a character to be seven modules in width.

The means for decoding each successive possible character after checking for the existence of a preceding intercharacter delineator consisting of a bar of width S1 and a space of width S1, includes means for continuing until the first of the following occurs: a) five characters are decoded; b) a character cannot be decoded; or c) an intercharacter delineator does not precede the last character decoded. The apparatus may further include means for locating a trailing margin having a predetermined minimum width after five characters are decoded.

Accordingly, it is an object of the present invention to provide a method and an apparatus for scanning an Add-On code portion of a bar code label to determine the bar code data printed thereon in which the successful location and decoding of an Add-On code portion is not dependent upon the successful location and decoding of any portion of the bar code label or segments thereof; and to provide such a method and apparatus in which the Add-On code portion of a label may be quickly, simply decoded.

Other objects and advantages of the invention will be apparent from the following description, the accompanying drawings and the appended claims.

BRIEF DESCRIPTION OF THE DRAWINGS

FIG. 6A is a pictorial representation of a UPC-A bar code label, including a primary code portion and a two character Add-On code portion;

FIG. 6B is a pictorial representation of a UPC-A bar code label, including a primary code portion and a five character Add-On code portion;

FIG. 6C is a pictorial representation of an EAN 13 bar code label, including a primary code portion and a two character Add-On code portion;

FIG. 6D is a pictorial representation of an EAN 13 bar code label, including a primary code portion a five character Add-On code portion;

FIG. 6E is a pictorial representation of an EAN 8 bar code label, including a primary code portion and a two character Add-On code portion;

FIG. 6F is a pictorial representation of an EAN 8 bar code label, including a primary code portion and a five character Add-On code portion;

FIG. 7 is a pictorial representation of a Two of Five Non-Interleaved bar code, including a primary code portion and an Add-On code portion.

FIG. 9 is a flow chart depicting steps which are used to determine the existence of a Add-On guard pattern.

DETAILED DESCRIPTION OF THE PREFERRED EMBODIMENT

Figure 1:
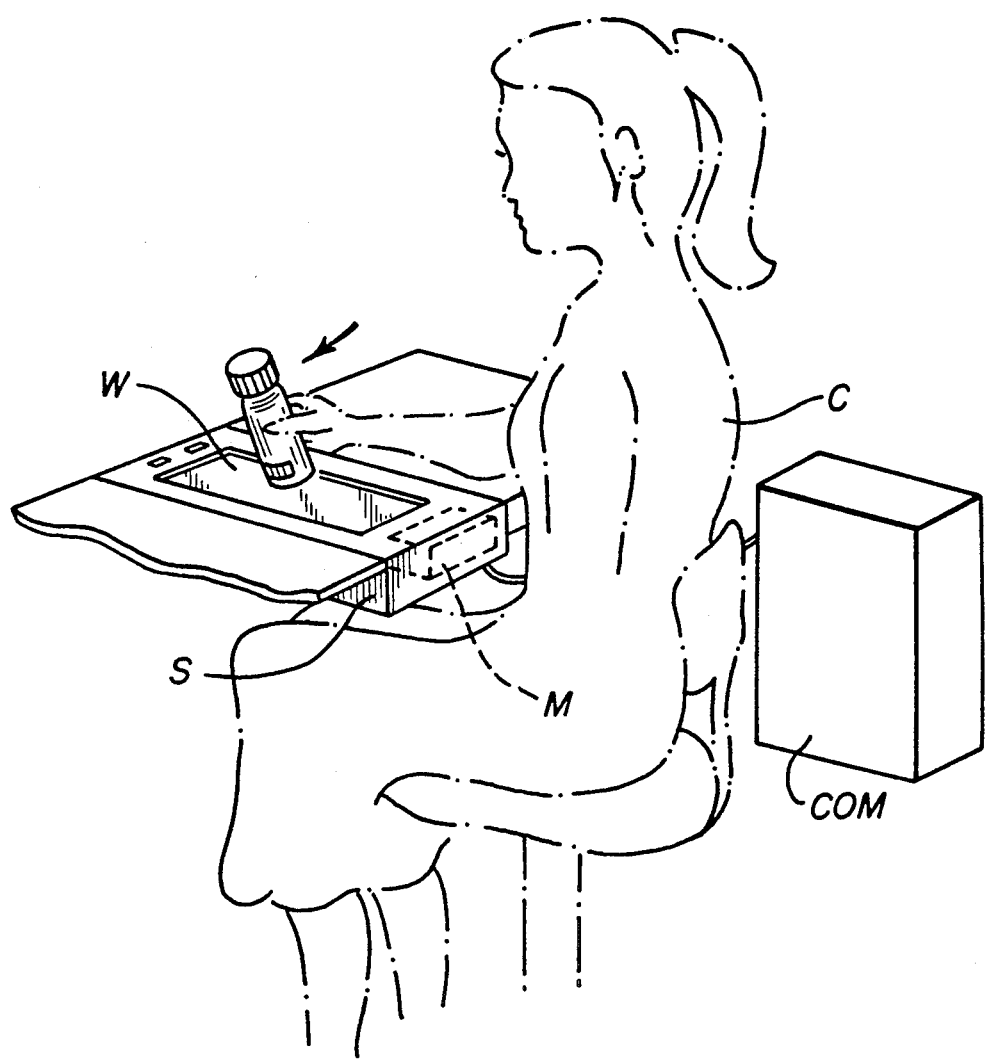
FIG. 1 is a pictorial view of a sales clerk at a checkout counter, using a laser scanner to scan a bar code label.

FIG. 1 of the drawings illustrates a computer controlled bar code scanner according to the present invention for scanning bar code labels to determine the bar code data printed thereon. As is explained more fully below, this bar code scanner is capable of scanning bar code labels having scan data printed thereon in bar codes of the type which include a primary code portion and which may also include an Add-On code portion. FIG. 1 is a pictorial view of a sales clerk C at a checkout counter, with a laser scanner system of this type being used to scan a product label.

The clerk C manually passes the product across a scanning station over a window W. The scanning beam emerges from the window so as to permit the beam to be swept across the label. A portion of the light reflected from the label passes downward from the arrangement of bars on the product label. The beam is caused to rapidly sweep through a series of scan paths which collectively produce a scan pattern in which the likelihood of a successful scan is high. It is desired that the scan pattern be such that it is highly probable that at least one scan path will traverse the label in a direction more or less perpendicular to the bars making up the bar code.

The scanner system of the present invention includes a scanner S comprising a scanner means for sweeping a scanning beam across the scanning station and providing an electrical scan signal indicating markings on surfaces presented to the scan station. The scanner also includes computer means, such as a microprocessor M, which is responsive to the scan signal for interpreting the scan signal as scan data signified by the scanned bar code labels. The computer means M determines whether a bar code label has been scanned properly, and whether valid scan data has been obtained, and supplies the scan data to the associated host computer COM.

Figure 2:
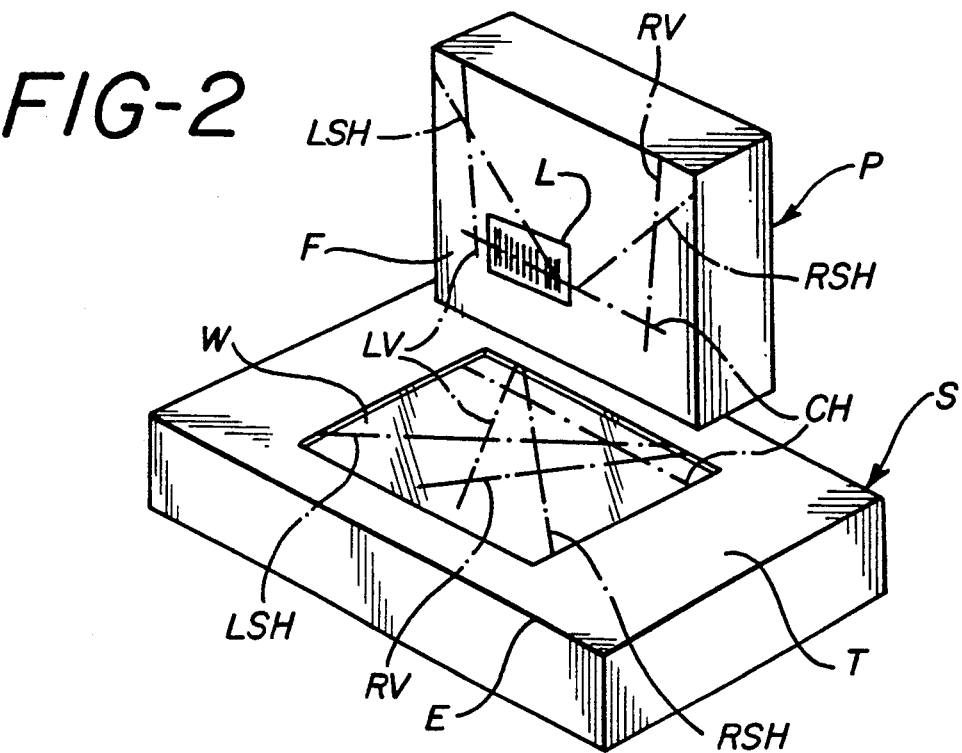
FIG. 2 is a perspective view of the laser scanner and a package disposed above the scanner and parallel to the front edge thereof and in a vertical position wherein a cross bar X scan pattern is projected on the scanner window and on the package face.

In common with many scanners in use today, the illustrated scanner uses a variation of what is called a "cross-bar X" scan pattern. FIG. 2 illustrates this scan pattern on the window W of the scanner S and on a face F of a package P, bearing a bar code label L, disposed parallel to the front edge E of the scanner S and in a vertical position. The cross bar X pattern consists of five scan lines: the center horizontal (CH) line, right and left side horizontal (RSH & LSH) lines, and right and left vertical (RV & LV) lines. Note the orthogonality of the RV and LV scan lines with the CH scan lines. Also note that in this instance, the CH scan line passes over the bar code label in a direction which is generally perpendicular to the bars making up the code.

Figure 3:
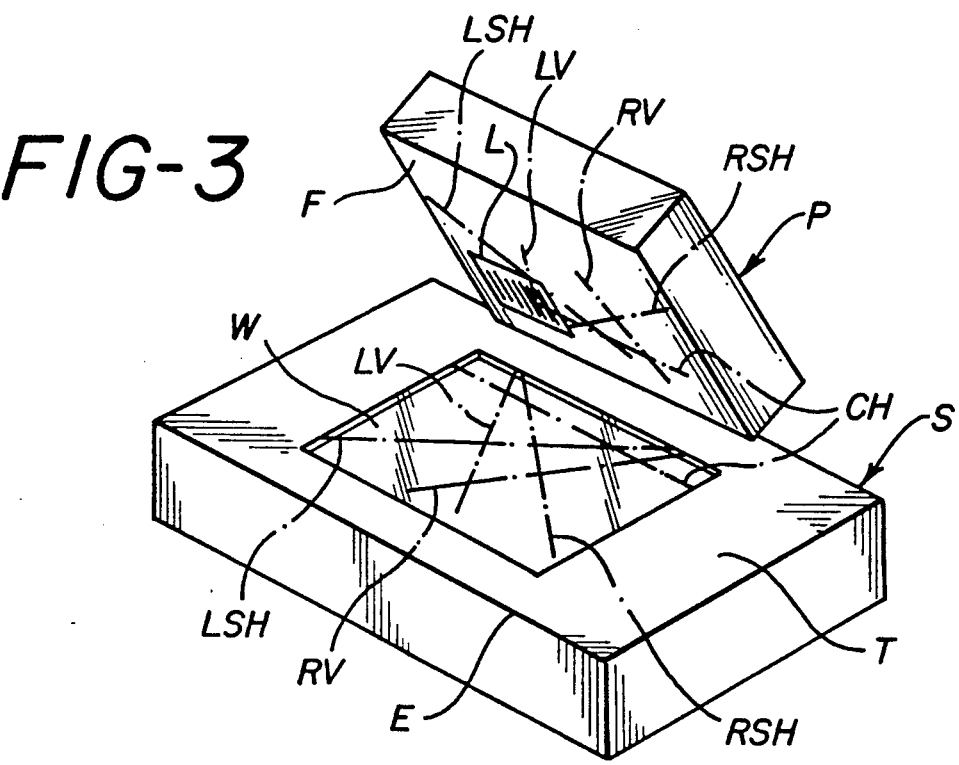
FIGS. 3–5 are perspective views similar to that of FIG. 2 but showing the cross bar X scan pattern on a package disposed at different orientations with respect to the laser scanner.
Figure 4:
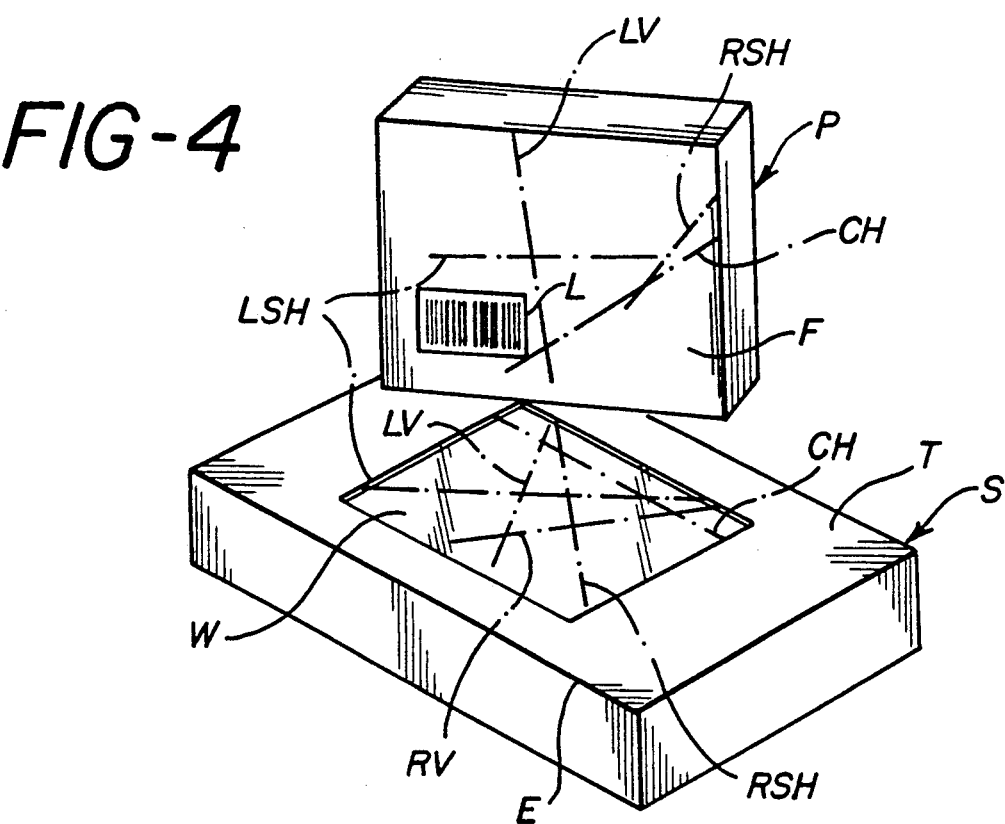
Figure 5:
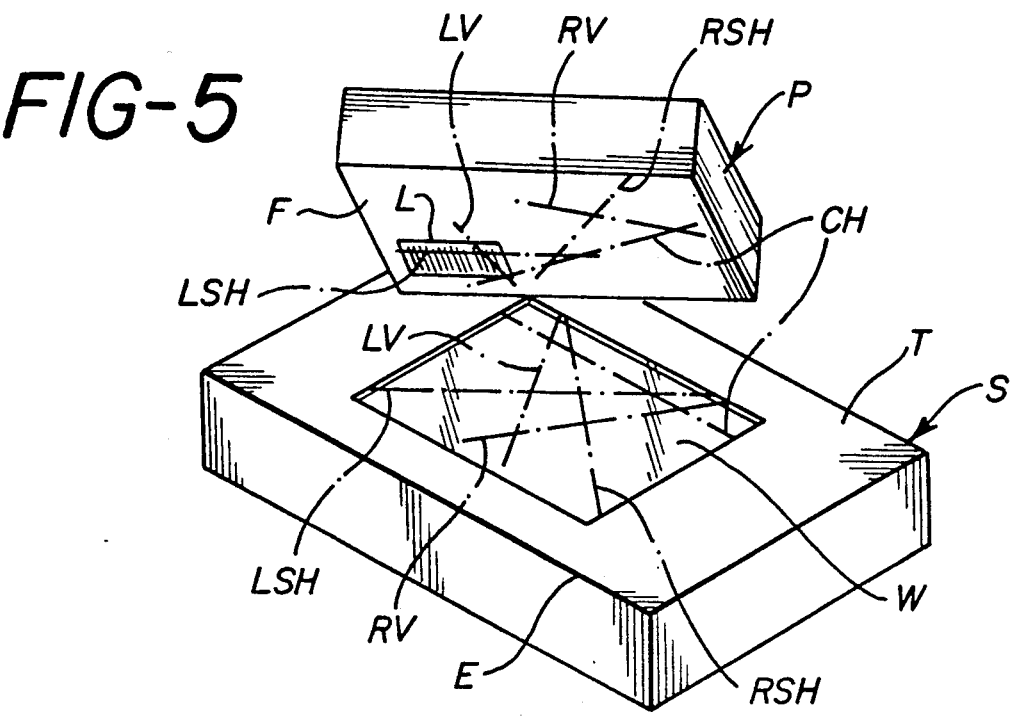

A more intuitive understanding of this scan pattern can be gained by examining depictions of the scan pattern on the package P in different orientations, as shown in FIGS. 3–5. In FIG. 3, the package face F is disposed parallel to the front edge E of the scanner S but leaned forty-five degrees toward the top T of the scanner. Note the orthogonality of the RV and RSH scan lines. In FIG. 4, the package face F is disposed in a vertical position but rotated forty-five degrees from the front edge E of the scanner S. Note the orthogonality of the LV and LSH scan lines. In FIG. 5, the package face F is rotated forty-five degrees from the front edge E of the scanner S and leaned forty-five degrees toward the top T of the scanner. Note the orthogonality of the LV and CH scan lines. In each of FIGS. 2–5, there is at least one set of perpendicularly crossing scan lines even though the label planes are at very different locations. Also note that scan lines CH and LSH are properly positioned for scanning the label L in FIGS. 2 and 5, respectively, that a scan line does not cross the label L in FIG. 4, and that scan lines LV and CH only pass over a portion of the bar code in FIG. 3.

Among the UPC and EAN bar codes, UPC-A, UPC-E, EAN 13 and EAN 8 labels support supplemental two and five character Add-On code portions. These supplemental codes are optionally appended to the standard labels. Previously, Add-On code portions have been scanned and read less reliably than the standard codes. There are two reasons for this: (1) less effective error checking capabilities are used, especially in the case of two character Add-On code portions, and (2) the standard label may be read without the Add-On code portion and usually no flag is used in the primary code portion to indicate that an Add-On code portion is being used.

Reference is now made to FIGS. 6, 7, and 8 which depict several different bar codes. FIG. 6A shows a UPC-A bar code having a primary code portion 10 and a two character Add-On code portion 12. Most UPC bar codes are two segment codes. That is, the primary code portion 10 is made up of an A segment, and a B segment. Typically, conventional scanners have permitted the two segments to be read during different scanning passes in order to increase the range of label orientations in which successful scanning may be accomplished. FIG. 6B shows a UPC-A bar code having a five character Add-On code portion. FIG. 6C shows an EAN 13 bar code having a two character Add-On portion. 6D shows an EAN 13 bar code having a five character Add-On portion. 6E shows an EAN 8 bar code having a five character Add-On portion. 6F shows an EAN 8 bar code having a five character Add-On portion.

Figure 8A:
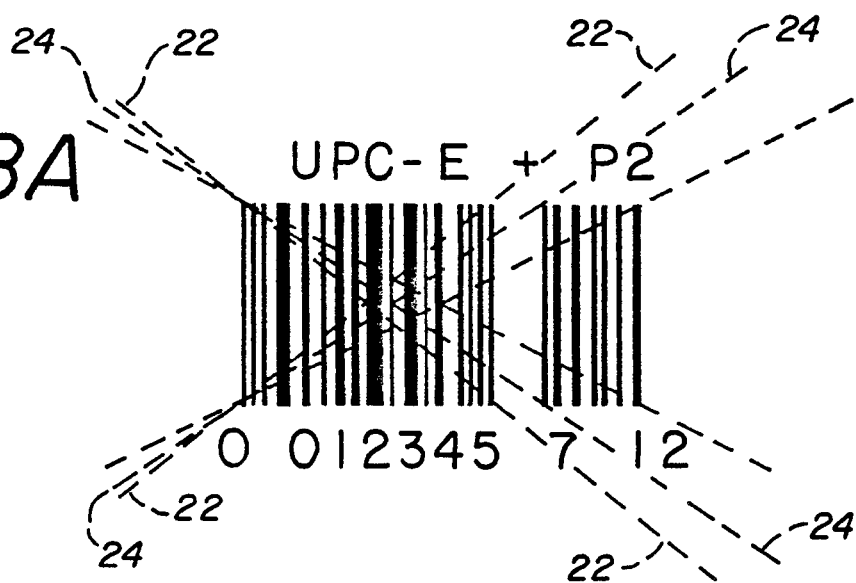
FIG. 8A is a pictorial representation of a one-segment UPC-E bar code, including a primary code portion and a two character Add-On code portion.
Figure 8B:
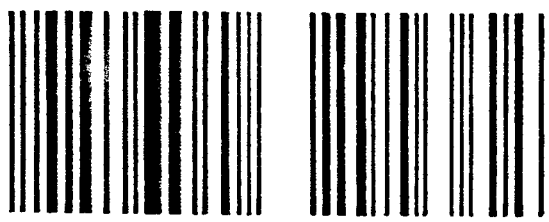
FIG. 8B is a pictorial representation of a one-segment UPC-E bar code, including a primary code portion and a five character Add-On code portion.

Similarly, FIG. 7 shows a Two of Five Non-Interleaved bar code having a primary code portion 10 and an Add-On code portion 12. FIG. 8A shows a UPC-E bar code having a primary code portion 10 and a two character Add-On code portion 12. Both of these codes are single segment codes. The Two of Five Non-Interleaved bar code is not presently in significant commercial use in the United States. FIG. 8B shows a UPC-E bar code having a primary code portion and a five character Add-On code portion.

As discussed above, it has not been simple previously for a scanner to scan both bar code labels having Add-On code segments and bar code labels not having Add-On code segments without the operator differentiating between the two types of bar code labels and providing to the scanner an indication of which type is currently being scanned. This has been true due to the geometry of the codes. Referring to FIG. 7, for instance, it will be seen that any number of successful scans of the primary code portion 10 may be made along a scan line between outer lines 14 and inner lines 16 without the scan line crossing the Add-On code portion 12. As a consequence, an ambiguity existed which was resolved by operator intervention in the scanner operation. This ambiguity was even greater with typical two-segment UPC codes, as illustrated by the spread between outer scan lines 18 and inner scan lines 20 in FIG. 6A. Finally, the greatest ambiguity is found with respect to UPC-E bar codes, as illustrated by the spread between outer scan lines 22 and inner scan lines 24 in FIG. 8A. This level of ambiguity is equaled in bar code scanners which permit either segment to be scanned alone during a single scanning pass.

One approach to scanning labels with Add-On segments and labels without Add-On segments without the need for operator intervention involved redundant scanning passes. More than one scanning pass of a label without scanning an Add-On segment was required to determine if an Add-On segment was present. Furthermore, scanning of an Add-On segment required simultaneous scanning of the adjacent segment of the primary code portion of the label. It will be appreciated that these requirements significantly slowed the scanning operation.

The present invention overcomes these difficulties by effecting scanning and decoding of an Add-On code portion as a completely separate operation, unrelated to the scanning of the primary code portion of the bar code label. The algorithm for finding a separate supplemental Add-On code segment relies on the structure of Add-On code portions specified in the *UPC Symbol Specification Manual*, January 1986 version by the Uniform Code Council, Inc., and the "General EAN Specification" 1987 version by the International Article Numbering Association. These documents specify requirements for the supplemental Add-On symbology. In the construction of the Add-On decoding algorithm, these specifications are relied upon for the leading and trailing margins, intercharacter delineators, the Add-On guard band, and the previous segment.

In the method of the present invention, an Add-On code portion of a bar code label to determine the bar code data printed thereon may be scanned by sweeping a scanning beam in a scan path across the Add-On code portion of the label. It will be appreciated, however, that other scanning techniques may be utilized to perform the scanning function. If desired, for example, the surface bearing the bar code segments may be imaged by video imaging techniques, and scan data taken from the pixel information acquired in this manner.

For purposes of illustration, however, a scanning beam may be swept across the label until the beam sweeps a scanning pass along a scan path which traverses a possible Add-On code portion. The scanner then provides data indicative of the structure of the possible Add-On code portion. This data is subjected to at least one test to determine the existence of an adjacent margin. Preferably, this is accomplished by checking to determine whether a margin exists adjacent to the Add-On guard pattern of the possible Add-On code portion which is greater than a predetermined minimum width and less than a predetermined maximum width. The predetermined minimum width is approximately 4 modules in width and the predetermined maximum width is approximately 20 modules in width. The above referenced specifications call for a margin between 7 and 12 modules in width. As a result, the relaxed limits used in this method allow the system to read segments that do not meet the uniform specifications due to printing errors. If these tests are not met, the decoding operation is terminated for this possible Add-On code portion.

Next, assuming that a margin of acceptable dimensions is found, the data indicative of the structure of the possible Add-On code portion is subjected to at least one test to determine the existence of an Add-On guard pattern. The Add-On guard pattern is checked for the distinctive pattern of a single module wide bar and a single module wide space followed by a two module wide bar, see for example the Add-On guard pattern 30 shown in FIG. 6B. This is done by the following tests, which are shown in the flow chart of FIG. 9 where G1 is the first bar element and G3 is the second bar element, with G2 being the separating space:

Margin $< 5*(G1+G2+G3)$, and

Margin $> (G1+G2+G3)$, and $3/2 > G1/G2 > 2/3$, and $5/2 > G3/G1 > 3/2$,

If these tests are not met, the decoding operation is terminated for this possible Add-On code portion. If these tests are met, however, the first character of the Add-On code portion is then decoded. The character specifications remain unchanged from that used for the main label characters. As a consequence, a conventional decoding algorithm is used for the actual character decoding operation. The total number of characters in a standard Add-On code segment is either two or five.

Following each character, except the last one of an Add-On code portion, is an intercharacter delineator or delineator character consisting of a single module wide bar S1 and a single module wide space S2. The present invention determines the existence of a valid intercharacter delineator after decoding each character by implementing the following tests:

$S2 < 2*m$ and $S1 < 2*m$ where m is the nominal single module width calculated from the preceding character. Each character of a UPC code is, by definition, seven modules in width. As a consequence, the width of the preceding character is divided by seven to calculate a nominal value for the width of a module. If either of the above two tests fails, the Add-On code portion is rejected.

The step of decoding each successive possible character after checking for the existence of a preceding intercharacter delineator consisting of a bar of width S1 and a space of width S2 continues until the first of the following occurs:
 a) five characters are decoded;
 b) a character cannot be decoded; or
 c) an intercharacter delineator does not precede the last character decoded.

Finally, after the first of the above occurs, a check is made to determine the existence of a trailing margin having a predetermined minimum width. This trailing margin must be at least five modules wide. There is no upper limit to the size of the trailing margin. If this test fails, the Add-On code portion is rejected. This test reduces the chances of scanning a portion of a five character Add-On and decoding it as a two character Add-On.

The method of the present invention is carried out by means of a scanner of conventional design operating in conjunction with a programmed microprocessor. An appropriate source code listing for effecting this method follows.

```
10  ;**********************************************************************
11  ;    ALGORITHM SUMMARY
12  ;
13  ; (1)  Find a large white space (margin) that is at least 5 modules wide,
14  ;         but less than 20 modules wide.
15  ; (2)  Determine scan direction from addon guard pattern.
16  ; (3)  Determine adjoining segment terminator (guard or center band). Init-
17  ;         ialize the addon segment string with constant designating which.
18  ; (4)  Using the segment termination data, initialize the LW, PNB, PNS,
19  ;         and M registers. Note that this is the same as for "standard" UPC
20  ;         segment decoding.
21  ; (5)  Find the adjoining character pattern and place it in the addon segment
22  ;         string buffer.
23  ; (6)  Attempt to decode a character.
24  ; (7)  Do character and element tests. If any test fails, clear segment
25  ;         string buffer and go to step 1 (reset).
26  ;.(8)  Place the decoded character in the addon segment string buffer.
27  ; (9)  If the number of characters in the addon segment string buffer is
28  ;         greater than 5, clear the addon segment string buffer and reset!
29  ;         (Look for the next margin: go to step 1).
30  ; (10) Check the inter-character elements. If test fails go to step 12.
31  ; (11) Increment by one frame width the current pointer and Go to step 6,
32  ;         try to decode the next character.
33  ; (12) If the number of characters in the addon segment string buffer is
34  ;         not 2 or 5, clear the addon segment string buffer and reset! (Look
35  ;         for the next margin: go to step 1.)
36  ; (13) Test the trailing margin of the addon segment to see that it is
37  ;         minimally 4 elements wide. If test fails clear the addon segment
38  ;         string buffer and reset (Look for the next margtin: go to step 1).
39  ; (14) Append the end of addon string constant to the characters in the
40  ;         addon segment string buffer.
41  ; (15) Send the contents of the addon segment string buffer.
42  ; (16) Reset! (Look for the next addon segment margin.)
43  ;
44  ;**********************************************************************
45  ; CHARACTER DECODING:
46  ;
47  ; The structure of characters is the same as with "standard" UPC/EAN
48  ; characters.
49  ;
50  ;             7 6 5 4 3 2 1 0
51  ;            _____
52  ;           | | | | | |       |
53  ;           |_|_|_|_|_____|
54  ;            : : : :   :
55  ;            : : : :   :....... 4 bit character pattern decoded by CHAR
56  ;            : : : :.............. FNB (set if NB > PNB * 1.5)
57  ;            : : :                 (indicates 2 module wide NB)
58  ;            : : :................ FNS (set if NS > PNS * 1.5)
59  ;            : :                   (indicates 2 module wide space)
60  ;            :  :.................... special start/termination useage
```

```
61  ;                    :..................... special start/termination useage
62  ;
63  ;
64  ; For the purposes of this algorithm a set of registers will need to be
65  ; reserved as follows:
66  ;               PNB  - narrow bar of the previously decoded character
67  ;               PNS  - narrow space of the previously decoded character
68  ;               NB   - narrow bar of the present character
69  ;               NS   - narrow space of the present character
70  ;               LW   - sum of elements e0+e1+e2+e3 of the previous character
71  ;               CW   - sum of elements e0+e1+e2+e3 of the present character
72  ;               M    - 9/64 * CW (approx. 1/7 CW)
73  ;
74  ;
75  ;**********************************************************************
76  ;   ALGORITHM TIMING
77  ;   N.B.: If a range of cycle times is shown, the lower number is the
78  ;   earliest that bad data will be rejected. The second number is the
79  ;   latest that bad data will be rejected, while the third number refers
80  ;   to good data.
81  ;
82  ;   Reset to beginning of margin search - 3 cycles
83  ;   Marin search - MARGIN loop - 14 cycles (worst case)
84  ;   Margin search and start character validation -
85  ;       29 (then MARGIN), 114 (then reset), 114
86  ;   Each data character -
87  ;       30 (then reset), 102 (then reset), 103
88  ;   Stop character -
89  ;       7 (then reset), 9 (then reset), 9
90
91  ;**********************************************************************
92  ;   OUTPUT MESSAGE FORMAT
93  ;   Segments of three or six characters are passed by the DAT through the
94  ;   reader function to here. The characters are represented by an eight
95  ;   bit pattern defined as follows:
96  ;
97  ;   7 6 5 4 3 2 1 0
98  ;   | | | | |_|_|_|_ 4 bit character pattern
99  ;   | | | |_____ FNB    set if NB > PNB * 1.5
100 ;   | | |_____ FNS    set if NS > PNS * 1.5
101 ;   | |_____ special start/termination useage
102 ;   |_____ special start/termination useage
103 ;
104 ;      where  NB - Narrow Bar of present character
105 ;             NS - Narrow Space of present character
106 ;             PNB - Narrow Bar of previous character
107 ;             PNS - Narrow Space of previous character
108 ;
109 ;      NOTE - ADDON GUARD BAND CONSTANTS =
110 ;          1100 ffff    for addon structures adjacent to UPC guard patterns
111 ;          1000 ffff    for addon structures adjacent to UPC-E center patterns
112 ;          1110 1110    is a special addon label termination constant
113 ;
114 ;                       ffff is the "frame character", the pattern decoded
115 ;                       across the guard or center from the structure
116 ;                       adjacent to the addon.
117 ;
118 ;
119 ;   Each bit pattern in the DAT generated segment represents a character
120 ;   weight which is used to retrieve a character and parity from the UPC
121 ;   character table. In the case of 1's or 2's we need to decide if the
```

```
122  ;   character represented is to be converted to a 1 or a /. The bit patterns
123  ;   for these are:
124  ;
125  ;           BIT PATTERN          CHARACTER/FEATURE    PARITY
126  ;           7 654 3210
127  ;             ff
128  ;             nn
129  ;             sb
130  ;           11 00 ffff           margin adjacent start
131  ;           10 00 ffff           center adjacent start
132  ;
133  ;           00 xx 0000           6 even
134  ;           00 xx 0001           0 odd
135  ;           00 xx 0010           4 even
136  ;           00 xx 0011           3 odd
137  ;           00 xx 0100           9 odd
138  ;           00 01 0101           2 even
139  ;           00 10 0101           8 even
140  ;           00 10 0110           1 odd
141  ;           00 01 0110           7 odd
142  ;           00 xx 0111           5 even
143  ;
144  ;           00 xx 1000           9 even
145  ;           00 10 1001           2 odd
146  ;           00 01 1001           8 odd
147  ;           00 01 1010           1 even
148  ;           00 10 1010           7 even
149  ;           00 xx 1011           5 odd
150  ;           00 xx 1100           6 odd
151  ;           00 xx 1101           0 even
152  ;           00 xx 1110           4 odd
153  ;           00 xx 1111           3 even
154  ;
155  ;       where:
156  ;           xx - don't care.
157  ;           ffff - frame character
158  ;
159  ;
160  ;**********************************************************************
161  ;   MAX COUNT SIZE REGISTER
162  ;   not used
163
164  ;**********************************************************************
165  ;   BACK COUNT CONTROL REGISTER SETTING REQUIRED
166  ;   Backward decoding must be large enough to hold data sufficient to
167  ;   decode an entire 5 segment label plus the potential frame character
168  ;   for the main label segment. This is
169  ;   38 characters.
170  ;   BAK 50
171
172  ;**********************************************************************
173  ;       REGISTER USAGE
174  ;           R0  - CHAR PATTERN
175  ;           R1  - LAST CHR WIDTH
176  ;           R2  - PRESENT CHR WIDTH
177  ;           R3  - T1 TWO TERM SUM / CHARACTER RETURN VALUE
178  ;           R4  - T2 TWO TERM SUM
179  ;           R5  - scratch
180  ;           R6  - scratch
181  ;           R7  - scratch
182  ;           R8  - NARROW SPACE VALUE (NS)
183  ;           R9  - NARROW BAR VALUE OF PREVIOUS CHARACTER (PNB)
```

```
184  ;           R10 - NARROW SPACE VALUE OF PREVIOUS CHARACTER (PNS)
185  ;           R11 - NARROW BAR VALUE (NB)
186  ;           R12 - CHARACTER LOOP COUNT
187  ;           R13 - 9/64 OF PRESENT CHAR WIDTH (M)
188  ;           R14 - TWO CHR ADDON SEGMENT LENGTH CONSTANT
189  ;           R15 - FIVE "    "    "     "     "
190  ;
191  ;
192  ;*****************************************************************
193  ;   CONSTANTS
194  ;
195  ;
196  GBCON  EQU  C0H              ;GUARD BAND CONSTANT
197  CBCON  EQU  80H              ;CENTER BAND CONSTANT
198  STOP   EQU  EEH              ;STOP CHR
199  TWO    EQU  2                ;VALID ADDON SEGMENT LENGTH CONSTANTS
200  FIVE   EQU  5
201
202  ;*****************************************************************
203         ORG  0
204  ;
205  RESET  SET  [SE,CE,CQ,CO]    ;RESTORE POINTER AND RESET MSG BUFFER
206         MOV  R0,C1
207         MOV  R0,C2            ;MAKE SURE COUNTS ACCESSED SEQUENTIALLY
208  ;
209  ;-----------------------------------------------------------------
210  ;
211  ;                     MARGIN CHECK
212  ;   Possible valid entry points depend upon the direction of the supple-
213  ;   mental addon segment scan and the type of the adjacent segment. If
214  ;   the addon segment is attached to a UPC-E label the data will be
215  ;   organized in the buffer (left to right):
216  ;
217  ;   FOREWARD SCAN OF UPC-E LABEL WITH ADDON
218
219  ;         UPC-E      UPC-E          ADDON              INTER-
220  ;         FRAME      CENTER BAND    GUARD    ADDON     CHAR      ADDON
221  ;         CHAR       PATTERN        PATTERN  CHAR      DELIM     CHAR
222  ;   ...  S B S B    S B S B S B    S  B S B  S B S B   S B       S B S B  ...
223  ;   ...  c c c c    1 1 1 1 1 1    M  1 1 2  c c c c   1 1       c c c c  ...
224
225
226
227  ;   BACKWARD SCAN OF UPC-E LABEL WITH ADDON
228
229  ;                   INTER-             ADDON            UPC-E       UPC-E
230  ;         ADDON     CHAR     ADDON     GUARD            CENTER BAND FRAME
231  ;         CHAR      DELIM.   CHAR      PATTERN          PATTERN     CHAR
232  ;   ...  B S B S   B S      B S B S   B S B    S       B S B S B S  B S B S ...
233  ;   ...  c c c c   1 1      c c c c   2 1 1    M       1 1 1 1 1 1  c c c c ...
234
235
236
237  ;   For UPC-A, EAN-8, and EAN-13 labels the supplemental addon segment
238  ;   will be found attached to the right hand segment of the label. These
239  ;   will be found organized in the buffer (again, left to right):
240  ;
241
242  ;   FOREWARD SCAN OF EAN-8, EAN-13, OR UPC-A LABEL WITH ADDON
243
244  ;         LABEL      LABEL          ADDON              INTER-
245  ;         FRAME      GUARD BAND     GUARD    ADDON     CHAR      ADDON
```

```
246  ;           CHAR       PATTERN       PATTERN  CHAR      DELIM    CHAR
247  ;    ...   S B S B     S B S     S    B S B    S B S B   S B     S B S B    ...
248  ;    ...   c c c c     1 1 1     M    1 1 2    c c c c   1 1     c c c c    ...
249
250
251
252  ;  BACKWARD SCAN OF EAN-8, EAN-13 OR UPC-A LABEL WITH ADDON
253
254  ;
255  ;                      INTER-              ADDON        LABEL       LABEL
256  ;           ADDON      CHAR      ADDON     GUARD        GUARD BAND  FRAME
257  ;           CHAR       DELIM.    CHAR      PATTERN      PATTERN     CHAR
258  ;    ...   B S B S     B S       B S B S   B S B    S   B S B      B S B S    ...
259  ;    ...   c c c c     1 1       c c c c   2 1 1    M   1 1 1      c c c c    ...
260  ;
261
262
263  ;        NOTE: With the above (and all other drawing in this document)
264  ;        the following constants apply:
265  ;           *  All number are in module widths, with B referring to
266  ;              bar elements and S to space elements.
267  ;           *  One module width is understood to be the smallest valid
268  ;              bar or space element in a segment section. Nominally
269  ;              this is 13 mills.
270  ;           *  M is a large white space (margin) at least six module
271  ;              widths wide.
272  ;           *  c are character elements, the sum of which for any
273  ;              character nominally total 7 module widths.
274  ;
275  ;
276  ;
277  ;  UPC Symbol Specification Manual (January 1986), Appendix E, requires
278  ;  that the supplimental addon be separated from the last bar of the
279  ;  "main" UPC-A, UPC-E, EAN13, or EAN8 label by a minimum of 7 modules
280  ;  and a maximum of 12 modules. The supplimental addon guard separator
281  ;  has the pattern:
282  ;               e1(B0) + e2(S0) + e3(B1)
283  ;
284  ;  yeilding a module sum of 4. 11/8 of this is 5.5 modules, which we use
285  ;  as our minimum separator to find supplimental addon's.
286  ;
287  MARGIN SET  [SE,CQ]           ;WAS [RP,SE,CQ]
288         MOV  R7,C3
289         ADD  R7,C4
290         ADD  R7,C5             ;R7 = e1+e2+e3
291         MOV  R6,R7 /4
292         ADD  R6,R7             ;R6 = 5/4 (C3+C4+C5) = 5 module widths
293
294         BLT  R6,C6 CKBKW       ;MARGIN BACKWARD
295  CKFWD  BLT  R6,C2 MFWD        ;MARGIN FOREWARD
296  FEXIT  JDL  MARGIN            ;DELAYED
297         SET  [IP,SP]           ;INCREMENT CURRENT POINTER
298
299  CKBKW  JFO  MBKW              ;BACKWARD DATA AVAIL - TRY DECODE
300         JMP  CKFWD             ;NO DATA - CHECK FORWARD (DELAYED)
301
302
303  ;----------------------------------------------------------------
304  ;
305  ;   DECODE SUPPLIMENTAL ADDON FOREWARD
306  ;   C2 IS MARGIN
307  ;   C3 ,C4 ,C5 ARE COUNTS OF ADDON GUARD PATTERN
```

```
308  ;
309  MFWD    MOV  R0,C2              ;MARGIN
310          MOV  R9,C3              ;G1
311          MOV  R3,C5              ;G3
312          CLL  CKGRD              ;CHECK ADDON GB (INIT'S PNB,PNS,LW)
313          BEQ  0,Q MFWD1
314          JMP  FEXIT
315
316  ;   ADDON GUARD PATTERN FOUND FOREWARD, CHECK FOR CENTER BAND OR
317  ;   GUARD BAND PATTERN ON AJOINING MAIN SEGMENT
318
319  MFWD1   SET  [DP]               ;DECREMENT POINTER
320          SET  [DP]
321          SET  [DP]
322          SET  [DP,CQ]
323          MOV  R5,C8 /2           ;S1 - FIRST SPACE ELEM. BEFORE MARGIN
324          ADD  R5,C8
325          BLT  R5,C6 FWDGB        ;IF S1*1.5 < S2, FWD GUARD BAND
326          BLT  R5,C4 FWDGB        ;IF S1*1.5 < S3, FWD GUARD BAND
327
328          SET  [DP,CQ]            ;FWD CENTER BAND (ADDON ATTACHED TO 'E' SEG.)
329          CLL  SPSUM              ;RETURNS: R2=CW, R8=NS, R11=NB
330          CLL  SPCHR1             ;MAKE THE FRAME CHAR PATTERN
331          JDL  FLOOP1
332          MIL  R0,CBCON
333
334  FWDGB   CLL  MKSUM
335          CLL  MKCHR1             ;MAKE THE FRAME CHAR. PATTERN
336          MIL  R0,GBCON
337
338  FLOOP1  ADD  R3,R0
339          MBL  R3                 ;BUFFER FRAME CHAR
340          SET  [RP]               ;C2 IS MARGIN AGAIN
341          SET  [IP]               ;INCREMENT PAST THE GUARD PATTERN
342  FLOOP   SET  [IP,SP,CQ]
343
344  ;*
345  ;*   DECODE A CHARACTER ON SPACE (FORWARD DECODE)
346  ;*   C2, C3 ,C4 ,C5 ARE COUNTS OF CHAR (STARTING ON A SPACE)
347  ;*
348          MOV  R1,R2              ;SAVE OLD CW INTO LW
349          CLL  SPSUM              ;INIT CW, NB, BS
350          CLL  SUMCHK             ;CHECK LW AGAINST CW
351          BNE  0,Q RESET
352
353          CLL  SPCHR              ;MAKE CHR & CHECK IT
354          MBL  R3                 ;SEND TO BUFFER
355          INC  R12,R12            ;INC CHAR COUNT
356
357          SET  [IP,SP,CQ]         ;INC POINTER & TEST ADDON CHR GUARD PATTERN
358          MOV  R7,C4
359          MOV  R7,C5
360          CLL  CKSEP              ;TEST ADDON CHR SEPARATOR
361          BNE  0,Q FEND           ;NO CHR SEPARATOR, MIGHT BE TRAILING MARGIN
362          BEQ  R15,R12 RESET      ;R15=5 - MAX CHR'S REACHED
363          JDL  FLOOP
364
365  FEND    SET  [IP]
366          BEQ  R12,R14 FOK
367          BNE  R12,R15 RESET
368
369  FOK     MOV  R7,R2 /2           ;R2 WAS LAST RECORDED CW
```

```
370         ADD   R2,R7 /2        ;R2 = (CW/2 +CW)/2 = CW*0.75
371         BGE   R2,C2 RESET
372         MIL   R0,STOP         ;MOV STOP CHR TO BUFFER
373         MBL   R0
374         JDL   RESET           ;DELAYED
375         SET   [DC,BP,SP]
376   ;
377   ;----------------------------------------------------------
378   ;
379   ;   DECODE SUPPLIMENTAL ADDON BACKWARD
380   ;   C6 IS MARGIN
381   ;   C3,C4,C5 ARE COUNTS OF ADDON GUARD PATTERN
382   ;
383   MBKW  MOV   R0,C6           ;MARGIN
384         MOV   R9,C5           ;G1
385         MOV   R3,C3           ;G3
386         CLL   CKGRD           ;CHECK FOR VALID ADDON GUARD PATTERN
387         BEQ   0,Q MBKW1
388         JMP   CKFWD
389
390   MBKW1 SET   [IP]
391         SET   [IP]
392         SET   [IP]
393         MOV   R5,C1
394         MOV   R5,C2 /2        ;C2 IS FIRST SPACE IN GB/CB - S1
395         ADD   R5,C2
396         SET   [IP]            ;C2 IS 2nd SPACE IN CB/1st SPACE IN CHR
397         MOV   R6,C1
398         BLT   R5,C2 BWDGB     ;IF S1*1.5 < S2
399         MOV   R6,C3
400         BLT   R5,C4 BWDGB     ;IF S1*1.5 < S3
401
402                               ;ADDON ATTACHED TO 'E' TECKET (FROM CENTER BAND)
403         SET   [IP,CQ]         ;C2 IS SPACE BEFORE 1st CHAR
404         CLL   MKSUM           ;INIT CW, NB, NS
405         CLL   MKCHR1          ;MAKE FRAME CHAR PATTERN
406         JDL   BLOOP1
407         MIL   R0,CBCON
408
409   BWDGB CLL   SPSUM           ;INIT CW, NB, NS
410         CLL   SPCHR1          ;MAKE FRAME CHAR PATTERN
411         MIL   R0,GBCON
412
413   BLOOP1 ADD  R3,R0
414         MBL   R3              ;BUFFER THE FRAME CHAR
415         SET   [RP]
416         SET   [DP]
417   BLOOP SET   [DP,CQ]
418   ;*
419   ;*    DECODE A CHARACTER ON MARK (BACKWARDS DECODE)
420   ;*    C3, C4, C5, C6 ARE COUNTS OF CHAR (STARTING ON A MARK)
421   ;*
422         MOV   R1,R2           ;LAST CHAR WIDTH
423         CLL   MKSUM
424         CLL   SUMCHK          ;TEST LW & CW
425         BEQ   0,Q BLOOP2
426         JMP   RESBK
427   ;
428   BLOOP2 CLL  MKCHR
429         MBL   R3              ;CHAR TO BUFFER
430         INC   R12,R12         ;INC CHAR COUNTER
431   ;
```

```
432         SET  [DP,CQ]         ;DEC POINTER TO ADDON CHR SEP & TEST
433         MOV  R7,C3
434         CLL  CKSEP           ;TEST ADDON CHR SEPARATOR
435         BNE  0,Q BEND
436         BEQ  R15,R12 RESBK   ;R15=5 - TOO MANY CHARACTERS
437         JF2  RESBK           ;IF END OF AVAIL DATA AND STILL NOT DONE
438         JDL  BLOOP           ;SKIP 4-CHAR TEST IF 6-CHAR DATA AVAILABLE
439         SET  [DP]
440  ;
441  BEND   MOV  R7,R2 /2        ;R2 WAS LAST RECORDED CW
442         ADD  R2,R7 /2        ;R2 = (CW/2 +CW)/2 = CW*0.75
443         BGE  R2,C4 RESBK     ;TRAILING MARGIN MIN. SIZE IS 5 ELEM.
444         BEQ  R12,R14 BOK
445         BEQ  R12,R15 BOK
446  ;
447  RESBK  SET  [RP]            ;RESTORE CURRENT POINTER AND SET BASE
448  BEXIT  JDL  RESET           ;RESET (EXECUTE NEXT INSTRUCTION
449         SET  [IP,BP,SP]
450  ;
451  BOK    MIL  R0,STOP         ;MOV STOP CHR TO BUFFER
452         MBL  R0
453         JDL  BEXIT
454         SET  [DC,RP]         ;EXECUTED BEFORE JUMP
455  ;
456  ;------------------------------------------------------------------
457  ;------------------------------------------------------------------
458  ;    MAKE A CHARACTER PATTERNS
459  ;    C3 AND C5 ARE BAR ELEMENTS OF CHARACTER
460  ;    C4 IS THE SPACE PATTERN
461  ;    IF FOREWARD DECODE (MKCHR): T1 = C3+C4   T2 = C4+C5
462  ;    IF BACKWARD DECODE (SPCHR): T1 = C5+C4   T2 = C4+C3
463
464  SPCHR  CLL  SPCHR1           ;RETURNS CHAR PATTERN IN R3 AND CLRS Q
465         MIL  R5,6
466         MOV  R0,R3           ;SAVE CHAR PATTERN FOR LATER
467         MOV  R13,C3          ;C3 = 2ND BAR OF CHAR
468         BNE  R3,R5 SNOO17    ;R5=6, CHECKS IF PATTERN IS ODD 1/7
469         JDL  SNOE17          ;NEXT INSTR GETS EXECUTED FIRST
470         MOV  R13,C5          ;USES C5 (1ST BAR) INSTEAD FOR ODD 1/7 CHK
471  ;
472  SNOO17 MIL  R5,10           ;PATTERN FOR EVEN 1/7
473         BNE  R3,R5 SNOE17    ;IF PATTERN IS NOT EVEN 1/7 - USE C3
474         MOV  R5,R13 /4       ;R5 = 1/4 C3
475         ADD  R5,R13 /4       ;R5 = 5/16 C3
476         ADD  R5,R13 /2       ;R5 = 21/32
477         ADD  R13,R5          ;R13 = 1-21/32 C3
478  ;
479  ; HERE WHEN R13 IS SET CORRECTLY
480  ;
481  SNOE17 JDL  AMB             ;GO SET AMBIGUITY BITS AND MERGE WITH CHAR
482         MOV  R8,C2
483  ;
484  SPCHR1 EQU  $               ;ENTRY HERE IF NO AMBIGUITY CHECKS WANTED
485         MOV  R3,C5
486         ADD  R3,C4
487         MOV  R4,C4
488         JDL  CHAR            ;CHAR ROUTINE DOES RETURN
489         ADD  R4,C3           ;GET T1 AND T2 (EXECUTED BEFORE JUMP)
490
491
492  ;  DECODE A CHARACTER ON MARK (BACKWARDS DECODE OR C-BAND OUT)
493  ;      ENTRY : C3, C4, C5, C6 ARE COUNTS OF CHAR (STARTING ON A MARK)
```

```
494  ;                 R2 IS CHAR WIDTH
495  ;
496  MKCHR    CLL   MKCHR1              ;RETURNS CHAR PATTERN IN R3 AND CLRS Q
497           MIL   R5,6
498           MOV   R13,C5              ;C5 = 2ND BAR OF CHAR
499           BNE   R3,R5 MNOO17        ;R15=6, CHECKS IF PATTERN IS ODD 1/7
500           JDL   MNOE17              ;NEXT INSTR GETS EXECUTED FIRST
501           MOV   R13,C3              ;USES C3 (1ST BAR) INSTEAD FOR ODD 1/7 CHK
502  ;
503  MNOO17   MIL   R5,10               ;PATTERN FOR EVEN 1/7
504           BNE   R3,R5 MNOE17        ;IF PATTERN IS NOT EVEN 1/7 - USE C3
505           MOV   R5,R13 /4           ;R5 = 1/4 C3
506           ADD   R5,R13 /4           ;R5 = 5/16 C3
507           ADD   R5,R13 /2           ;R5 = 21/32
508           ADD   R13,R5              ;R13 = 1-21/32 C3
509  ;
510  ;  HERE WHEN R13 IS SET CORRECTLY
511  ;
512  MNOE17   JDL   AMB                 ;GO SET AMBIGUITY BITS AND MERGE WITH CHAR
513           MOV   R8,C6
514  ;
515  MKCHR1   EQU   $                   ;ENTRY HERE IF NO AMBIGUITY CHECKS WANTED
516           MOV   R3,C3
517           ADD   R3,C4
518           MOV   R4,C4
519           JDL   CHAR                ;CHAR ROUTINE DOES RETURN
520           ADD   R4,C5               ;GET T1 AND T2 (EXCUTED BEFORE JUMP)
521  ;
522  ;
523  ;-----------------------------------------------------------------
524  ;    CHARACTER DECODE ROUTINE
525  ;    ON ENTRY R2 = CHAR WIDTH
526  ;             R3 = FIRST TWO TERM SUM (T1)
527  ;             R4 = SECOND TWO TERM SUM (T2)
528  ;             R9 = NARROW BAR OF PREVIOUS CHAR (PNB)
529  ;             R10 = NARROW SPACE OF PREVIOUS CHAR (PNS)
530  ;             R11 = CURRENT CHAR NARROW BAR (NB)
531  ;             R8  = CURRENT CHAR NARROW SPACE (NS)
532  ;
533  ;    ON EXIT R3 = CHAR PATTERN (BITS 0-3) + PREVIOUS Q3-Q1 (BITS 6-4)
534  ;            Q = 0 IF CHARACTER IS LEGAL
535  ;               <>0 IF CHARACTER DOES NOT PASS ALL TESTS
536  ;
537  ;    NOTE: USUALLY PRECEDED BY THE 'AMB' ROUTINE WHICH SETS THE AMBIGUITY
538  ;          RESOLUTION BITS
539  ;
540  ;    USES: R5,R6,R7,R1,R13
541  ;
542  CHAR     MOV   R6,R2 /2            ;CALCULATE THRESHOLDS
543           MOV   R7,R6 /2            ;R6 = 1/2 S   R7 = 1/4 S
544           MOV   R5,R7 /2            ;R5 = 1/8
545           ADD   R5,R7 /2            ;R5 = 3/16
546           ADD   R5,R7 /2            ;R5 = 7/32
547           ADD   R5,R6 /2            ;R5 = 23/64
548           MOV   R7,R7 /4            ;R7 = 1/16
549           ADD   R7,R6 /2            ;R7 = 9/32
550           ADD   R7,R2 /2            ;R7 = 41/64
551  ;
552  ; R5 = THRESH 1 (23/64)
553  ; R6 = THRESH 2 (1/2)
554  ; R7 = THRESH 3 (41/64)
555  ;
```

```
556  ;    CALCULATE FIRST TERM SUM WEIGHT
557  ;
558         SET   [SQ]
559         INQ   R5,R3
560         INQ   R6,R3
561         INQ   R7,R3 [SQ]          ;POST SHIFT
562  ;
563  ;    CALCULATE SECOND TERM SUM WEIGHT
564  ;
565         SET   [SQ]
566         INQ   R5,R4
567         INQ   R6,R4
568         INQ   R7,R4
569  ;
570         MOV   R3,Q                ;SAVE THE CHAR PATTERN
571         SET   [CQ]
572         RET
573  ;
574  ;----------------------------------------------------------------
575  ;    CHARACTER SUM ROUTINES TO FIND CW, NB & NS
576  ;    IF FOREWARD C3 IS FIRST BAR OF CHAR
577  ;    IF BACKWARD C5 IS FIRST BAR OF CHAR
578  ;
579  SPSUM  MOV   R2,C2
580         ADD   R2,C3
581         ADD   R2,C4
582         ADD   R2,C5               ;GET THIS CHR'S WIDTH
583         RET
584  ;
585  MKSUM  MOV   R2,C3
586         ADD   R2,C4
587         ADD   R2,C5
588         ADD   R2,C6
589         RET
590  ;
591  ;    SUM CHECK ROUTINE
592  ;
593  ;      R1 = LAST WIDTH
594  ;      R2 = THIS WIDTH
595  ;
596  SUMCHK SET   [CQ]
597         MOV   R6,R2 /2             ;R6 = 1/2 R2
598         ADD   R6,R2 /4             ;R6 = 3/8 R2
599         ADD   R6,R2 /2             ;R6 = 11/16 R2
600         ADD   R6,R2 /2             ;R6 = 27/32 R2
601         INQ   R1,R6 [SQ]           ;SET IF 27/32 R2 (THIS WIDTH) > R1 (LAST)
602         MOV   R6,R1 /2             ;R6 = 1/2 R1
603         ADD   R6,R1 /4             ;R6 = 3/8 R1
604         ADD   R6,R1 /2             ;R6 = 11/16 R1
605         ADD   R6,R1 /2             ;R6 = 27/32 R1
606         INQ   R2,R6 [SQ]           ;SET IF 27/32 R1 (LAST WIDTH) > R2 (THIS)
607         RET
608  ;
609  ;----------------------------------------------------------------
610  ;    ROUTINE: AMB - SETS AMBIGUITY BITS IN Q REGISTER
611  ;
612  ;         ENTRY:   Q CLEARED
613  ;                  R8 IS ONE SPACE OF THE CHARACTER
614  ;                  R9 IS PREVIOUS CHAR NARROW BAR (PNB)
615  ;                  R10 IS PREVIOUS CHAR NARROW SPACE (PNS)
616  ;                  R13 IS SET TO (SCALED) BAR VALUE FOR "VLSI" COMPARISON
617  ;                  C3,C5 POINT TO BARS IN CHARACTER
```

```
618 ;                 C4 POINTS TO THE OTHER SPACE IN THE CHARACTER
619 ;
620 ;       EXIT:     Q SET TO AMBIGUITY CALCULATION WEIGHTING
621 ;                 IF C4 (FIRST SPACE IN CHAR) > R13, THEN Q BIT 6 SET
622 ;                 IF NS > 1.5 * PNS THEN Q BIT 5 SET
623 ;                 IF NB > 1.5 * PNB THEN Q BIT 4 SET
624 ;                 R9 IS UPDATED WITH NEW VALUE OF PNB
625 ;                 R10 IS UPDATED WITH NEW VALUE OF PNS
626 ;                 R3 HAS MERGE OF CHAR PATTERN (BITS 0-3) WITH AMB BITS
627
628 ;                 USES: R6,R11
629 ;
630 AMB     INQ   R13,C4 [SQ]        ;SET "VLSI" AMBIGUITY BIT
631         SLE   R8,C4              ;R8 IS NOW NS
632         MOV   R11,C3
633         SLE   R11,C5             ;R11 IS NOW NB
634 ;
635 ;   MAKE AMBIGUITY BITS AND ADJUST PNB AND.OR PNS IF NECESSARY
636 ;
637         MOV   R6,R10 /2
638         ADD   R6,R10             ;R6 = 1.5 * PNS
639         INQ   R6,R8 [SQ]         ;Q BIT 1 SET IF NS > 1.5 * PNS
640         BLT   R6,R8 AMB2         ;IF SET (NS IS > THAN ONE MODULE)
641         MOV   R10,R8             ;IF NS IS 1 MODULE, THEN SET PNS = NS
642 AMB2    MOV   R6,R9 /2
643         ADD   R6,R9              ;R6 = 1.5 * PNB
644         INQ   R6,R11 [SQ]        ;Q BIT 1 SET IF NB > 1.5 * PNB
645                                  ;PREVIOUS BIT 1 MOVES TO BIT 2
646         BLT   R6,R11 AMB3        ;IF SET (NB IS > THAN ONE MODULE)
647         MOV   R9,R11             ;IF NB IS 1 MODULE, THEN SET PNB = NB
648 ;
649 ;   SHIFT BITS OVER TO MAKE ROOM FOR CHAR PATTERN
650 ;
651 AMB3    SET   [SQ]
652         SET   [SQ]
653         SET   [SQ]
654         ADD   R3,Q               ;ADD TO CHAR PATTERN
655         RET
656
657 ;----------------------------------------------------------------
658 ;   CHECK ADDON CHR SEPERATOR
659 ;   ENTRY: R7 - BAR (BKWD) OR SPACE (FWD) ELEM.
660 ;                 INTERCHARACTER SEPARATER
661 ;          C4 - SPACE (BKW., OR BAR (FWD) ELEM.
662 ;          R13 - M (1/7 of CW = 1 module)
663 CKSEP   MOV   R5,R13
664         ADD   R5,R13             ;R13 = 2 * M
665         INQ   R5,C4              ;SET IF e1 > 2M
666         INQ   R5,R7              ;SET IF e2 > 2M
667         RET
668 ;
669 ;----------------------------------------------------------------
670 ;       TEST FOR ADDON GUARD PATTERN
671 ;
672 ;   Test:    (1)   e0 < 4(e1+e2+e3)
673 ;            (2)   3/2 > e1/e2 > 2/3
674 ;            (3)   5/2 > e3/e1 > 3/2
675 ;   ENTRY:   R0 = e0 (margin)
676 ;            R9 = e1 (C3/G1 if forward, C5/G1 if backward)
677 ;            C4 = e2 space, forward or backward)
678 ;            R3 = e3 (C5/G3 if forward, C3/G3 if backward)
679 ;            R7 = e1+e2+e3
```

```
680  ; EXIT:     Q = 0 iff no error
681  ;           R1 = init'ed Last_Width = 9/5[e1+e2+e3]
682  ;
683  CKGRD MOV  R5,R7           ;R7 = e1+e2+e3
684        ADD  R5,R5
685        ADD  R5,R5
686        ADD  R5,R7           ;R5 = 5(e1+e2+e3)
687        INQ  R5,R0           ;SET IF  MARGIN > 5(e1+e2+e3)
688
689        MOV  R5,R9 /2
690        ADD  R5,R9
691        INQ  R3,R5           ;SET IF  g1 * 1.5 > g3
692
693        MOV  R10,C4 /2
694        INQ  R5,R10          ;SET IF  g2/2 > g1*1.5
695
696        ADD  R5,R5
697        INQ  R5,R3           ;SET IF  g3 > g1*3.0
698
699        MOV  R10,C4
700        INQ  R3,R10          ;SET IF  g2 > g3
701
702        BEQ  0,Q ADINIT
703        RET
704  ;
705  ;   SEND ADDON MARGIN/START CHARACTER AND MARGIN COUNT
706  ;   INITIALIZE LAST WIDTH WITH 7/4(e1+e2+e3)
707  ;   ENTRY: R7 = e1+e2+e3
708  ;          R0 = e0 (margin count)
709  ;          R10 = PREVIOUS NARROW SPACE VALUE (PNS)
710  ;          R9  = PREVIOUS NARROW BAR VALUE (PNB)
711  ;   EXIT:  R1 - LW, 7/4(e1+e2+e3)
712  ;          R12 - CHAR COUNT INIT'ED to 0
713  ;
714  ADINIT MIL  R12,0           ;INIT CHR COUNT
715         MIL  R14,TWO         ;MESSAGE LENGTH CONSTANTS
716         MIL  R15,FIVE
717         MOV  R1,R7 /2        ;R1 = n/2
718         ADD  R1,R7 /2        ;R1 = (n/2 + n) / 2 = 0.75n
719         ADD  R1,R7           ;R1 = 1.75n = 7/4 * n (7 module widths nom.)
720         RET
721
722
723  ;*********************************************************************
724  ;                              end
725  ;*********************************************************************
726
727
728
729
730
```

Having described the invention in detail and by reference to the preferred embodiments thereof, it will be apparent that other modifications and variations are possible without departing from the scope of the invention defined in the appended claims.

What is claimed is:

1. A method of scanning an Add-On code portion of a bar code label to determine the bar code data printed thereon by sweeping a scanning beam in a scan path across the Add-On code portion of the label, said bar code labels bearing bar codes of the type which include a primary code portion and which may also include an Add-On code portion, comprising the steps of:

sweeping a scanning beam across the label until the beam sweeps a scanning pass along a scan path which traverses a possible Add-On code portion;

providing data indicative of the structure of the possible Add-On code portion;

subjecting the data indicative of the structure of the possible Add-On code portion to at least one test to determine the existence of an adjacent margin;

subjecting the data indicative of the structure of the possible Add-On code portion to at least one test to determine the existence of an Add-On guard pattern;

decoding the characters of the possible Add-On code portion of the label; and terminating decoding.

2. The method of scanning an Add-On code portion of a bar code label to determine the bar code data printed thereon according to claim 1, in which the step of subjecting the data indicative of the structure of the possible Add-On code portion to at least one test to determine the existence of an Add-On guard pattern comprises the step of checking to determine whether:

$$\text{Margin} < 5*(G1+G2+G3), \text{ and}$$

$$\text{Margin} > (G1+G2+G3), \text{ and}$$

$$3/2 > G1/G2 > 2/3, \text{ and}$$

$$5/2 > G3/G1 > 3/2,$$

where G1 is the width of the first bar element of the guard pattern of the possible Add-On code portion, G3 is the width of the second bar element of the guard pattern of the possible Add-On code portion, and G2 is the width of the space between the first and second bar elements of the guard pattern of the possible Add-On code portion.

3. The method of scanning an Add-On code portion of a bar code label to determine the bar code data printed thereon according to claim 1, in which the step of subjecting the data indicative of the structure of the possible Add-On code portion to at least one test to determine the existence of an adjacent margin comprises the step of checking to determine whether a margin exists adjacent to the Add-On guard pattern of the possible Add-On code portion which is greater than a predetermined minimum width and less than a predetermined maximum width.

4. The method of scanning an Add-On code portion of a bar code label to determine the bar code data printed thereon according to claim 3, in which said predetermined minimum width is approximately 4 modules in width and the predetermined maximum width is approximately 20 modules in width, the guard pattern of the possible Add-On code portion consisting of a one module width, first bar element, a two module width, second bar element, and a one module space between said first and second bar elements.

5. The method of scanning an Add-On code portion of a bar code label to determine the bar code data printed thereon according to claim 1, in which the step of decoding the characters of the Add-On code portion of the label includes the steps of:

decoding the first possible character of said possible Add-On code portion, and checking for the existence of an adjacent intercharacter delineator consisting of a bar of width S1 and a space of width S2, decoding each successive possible character after checking for the existence of a preceding intercharacter delineator consisting of a bar of width S1 and a space of width S2.

6. The method of scanning an Add-On code portion of a bar code label to determine the bar code data printed thereon according to claim 5, in which the widths of said bar and said space making up each intercharacter delineator are checked to determine the $$S2 < 2*m \quad \text{and}$$
$$S1 < 2*m \quad \text{where m is the nominal single module width calculated from the preceding character,}$$

failing which the possible Add-On code portion is determined not to be an Add-On code portion of a label, and decoding is terminated.

7. The method of scanning an Add-On code portion of a bar code label to determine the bar code data printed thereon according to claim 6, in which the step of decoding each successive possible character after checking for the existence of a preceding intercharacter delineator consisting of a bar of width S1 and a space of width S2 continues until the first of the following occurs:

a) five characters are decoded;

b) a character cannot be decoded; or c) an intercharacter delineator does not precede the last character decoded.

8. A method of scanning an Add-On code portion of a bar code label to determine the bar code data printed thereon, said bar code label including a primary code portion and an Add-On code portion, comprising the steps of:

optically scanning the label and producing an electrical signal indicative of the image of the label which includes a possible Add-On code portion;

providing data indicative of the structure of the possible Add-On code portion in response to said electrical signal;

subjecting the data indicative of the structure of the possible Add-On portion to at least one test to determine the existence of an adjacent margin;

subjecting the data indicative of the structure of the possible Add-On code portion to at least one test to determine the existence of an Add-On guard pattern;

decoding the characters of the possible Add-On code portion of the label; and terminating decoding.

9. The method of scanning an Add-On code portion of a bar code label to determine the bar code data printed thereon according to claim 8, in which the step of subjecting the data indicative of the structure of the possible Add-On code portion to at least one test to determine the existence of an Add-On guard pattern comprises the step of checking to determine whether:

$$\text{Margin} < 5*(G1+G2+G3), \text{ and}$$

$$\text{Margin} > (G1+G2+G3), \text{ and}$$

$$3/2 > G1/G2 > 2/3, \text{ and}$$

$$5/2 > G3/G1 > 3/2,$$

where G1 is the width of the first bar element of the guard pattern of the possible Add-On code portion, G3 is the width of the second bar element of the guard pattern of the possible Add-On code portion, and G2 is the width of the space between the first and second bar elements of the guard pattern of the possible Add-On code portion.

10. The method of scanning an Add-On code portion of a bar code label to determine the bar code data printed thereon according to claim 8, in which the step of subjecting the data indicative of the structure of the possible Add-On code portion to at least one test to determine the existence of an adjacent margin comprises the step of checking to determine whether the a margin exists adjacent to the Add-On guard pattern of the possible Add-On code portion which is greater than a predetermined minimum width and less than a predetermined maximum width.

11. The method of scanning an Add-On code portion of a bar code label to determine the bar code data printed thereon according to claim 10, in which said predetermined minimum width is approximately 4 modules in width and the predetermined maximum width is approximately 20 modules in width, the guard pattern of the possible Add-On code portion consisting of a one module width, first bar element, a two module width, second bar element, and a one module space between said first and second bar elements.

12. The method of scanning an Add-On code portion of a bar code label to determine the bar code data printed thereon according to claim 8, in which the step of decoding the characters of the Add-On code portion of the label includes the steps of:

decoding the first possible character of said possible Add-On code portion, and checking for the existence of an adjacent intercharacter delineator consisting of a bar of width S1 and a space of width S2, decoding each successive possible character after checking for the existence of a preceding intercharacter delineator consisting of a bar of width S1 and a space of width S2.

13. The method of scanning an Add-On code portion of a bar code label to determine the bar code data printed thereon according to claim 12, in which the widths of said bar and said space making up each intercharacter delineator are checked to determine that

| | |
|---|---|
| S2 < 2*m | and |
| S1 < 2*m | where m is the nominal single module width calculated from the preceding character, | failing which the possible Add-On code portion is determined not to be an Add-On code portion of a label, and decoding is terminated.

14. The method of scanning an Add-On code portion of a bar code label to determine the bar code data printed thereon according to claim 12, in which the step of decoding each successive possible character after checking for the existence of a preceding intercharacter delineator consisting of a bar of width S1 and a space of width S2 continues until the first of the following occurs:

a) five characters are decoded;
b) a character cannot be decoded; or
c) an intercharacter delineator does not precede the last character decoded.

15. The method of scanning an Add-On code portion of a bar code label to determine the bar code data printed thereon according to claim 14, in which, after five characters are decoded, a check is made to determine the existence of a trailing margin having a predetermined minimum width.

16. Apparatus for scanning an Add-On code portion of a bar code label to determine the bar code data printed thereon, said bar code label including a primary code portion and an Add-On code portion, comprising:

means for optically scanning the label and producing an electrical signal indicative of the image of the label which includes a possible Add-On code portion;

means, responsive to said electrical signal, for providing data indicative of the structure of the possible Add-On code portion;

means for subjecting the data indicative of the structure of the possible Add-On code portion to at least one test to determine the existence of an adjacent margin;

means for subjecting the data indicative of the structure of the possible Add-On code portion to at least one test to determine the existence of an Add-On guard pattern;

means for decoding the characters of the possible Add-On code portion of the label; and means for terminating decoding.

17. Apparatus for scanning an Add-On code portion of a bar code label to determine the bar code data printed thereon according to claim 16, in which said means for subjecting the data indicative of the structure of the possible Add-On code portion to at least one test to determine the existence of an Add-On guard pattern comprises means for checking to determine whether:

Margin<5*(G1+G2+G3), and

Margin>(G1+G2+G3), and

3/2>G1/G2>2/3, and

5/2>G3/G1>3/2, where G1 is the width of the first bar element of the guard pattern of the possible Add-On code portion, G3 is the width of the second bar element of the guard pattern of the possible Add-On code portion, and G2 is the width of the space between the first and second bar elements of the guard pattern of the possible Add-On code portion.

18. Apparatus for scanning an Add-On code portion of a bar code label to determine the bar code data printed thereon according to claim 16, in which said means for subjecting the data indicative of the structure of the possible Add-On code portion to at least one test to determine the existence of an adjacent margin comprises means for checking to determine whether a margin exists adjacent to the Add-On guard pattern of the possible Add-On code portion which is greater than a predetermined minimum width and less than a predetermined maximum width.

19. Apparatus for scanning an Add-On code portion of a bar code label to determine the bar code data printed thereon according to claim 18, in which said predetermined minimum width is approximately 4 modules in width and the predetermined maximum width is approximately 20 modules in width, the guard pattern of the possible Add-On code portion consisting of a one module width, first bar element, a two module width, second bar element, and a one module space between said fist and second bar elements.

20. Apparatus for scanning an Add-On code portion of a bar code label to determine the bar code data printed thereon according to claim 16, in which said means for decoding the characters of the Add-On code portion of the label includes:

means for decoding the first possible character of said possible Add-On code portion, and means for checking for the existence of an adjacent intercharacter delineator consisting of a bar of width S1 and a space of width S2, means for decoding each successive possible character after checking for the existence of a preceding intercharacter delineator consisting of a bar of width S1 and a space of width S2.

21. Apparatus for scanning an Add-On code portion of a bar code label to determine the bar code data printed thereon according to claim 20, in which the widths of said bar and said space making up each intercharacter delineator are checked to determine that

| | |
|---|---|
| S2 < 2*m | and |
| S1 < 2*m | where m is the nominal single module width calculated from the preceding character, | failing which the possible Add-On code portion is determined not to be an Add-On code portion of a label, and decoding is terminated.

22. Apparatus for scanning an Add-On code portion of a bar code label to determine the bar code data printed thereon according to claim 20, in which said means for decoding each successive possible character after checking for the existence of a preceding intercharacter delineator consisting of a bar of width S1 and a space of width S2, includes means for continuing until the first of the following occurs:
 a) five characters are decoded;
 b) a character cannot be decoded; or
 c) an intercharacter delineator does not precede the last character decoded.

23. Apparatus for scanning an Add-On code portion of a bar code label to determine the bar code data printed thereon according to claim 22, further including means for determining the existence of a trailing margin having a predetermined minimum width following the decoding of five characters.

* * * * *

UNITED STATES PATENT AND TRADEMARK OFFICE
CERTIFICATE OF CORRECTION

PATENT NO. : 5,311,000
DATED : 5/10/94
INVENTOR(S) : Michael Brooks

It is certified that error appears in the above-indentified patent and that said Letters Patent is hereby corrected as shown below:

Column 35, line 69 "determine the" should read
--determine that--.

Column 38, line 61 "said fist" should read --said first--.

Signed and Sealed this

Twenty-third Day of August, 1994

Attest:

BRUCE LEHMAN

*Attesting Officer*    *Commissioner of Patents and Trademarks*